Figure 1:
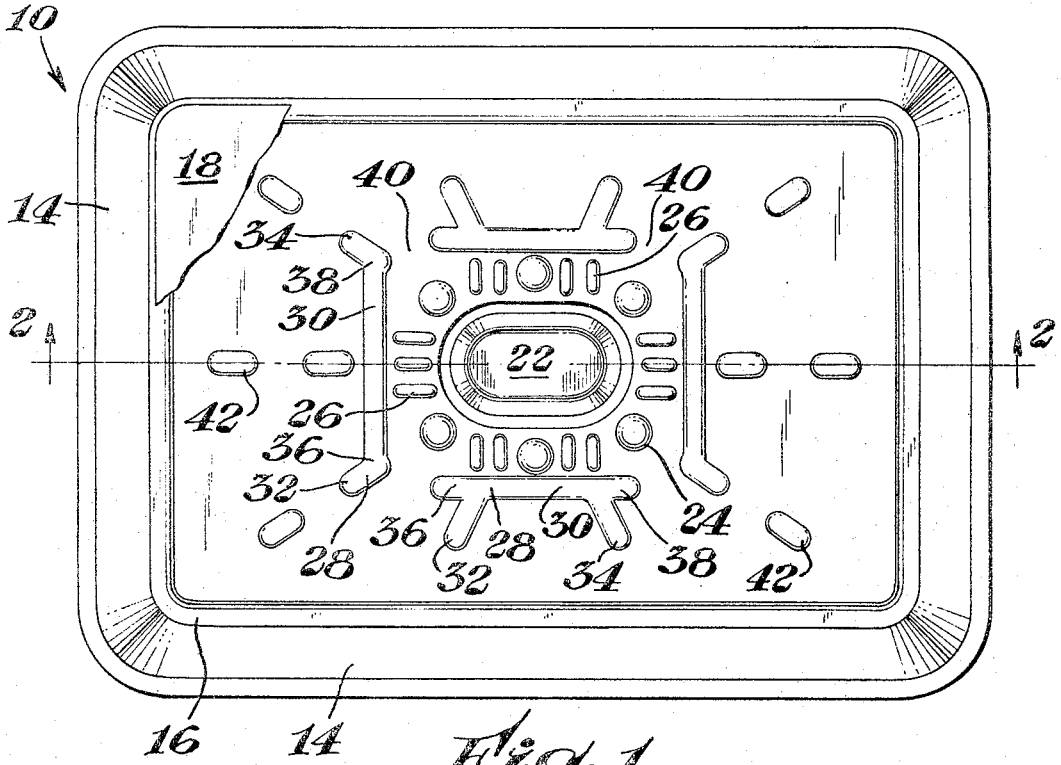
Figure 2:
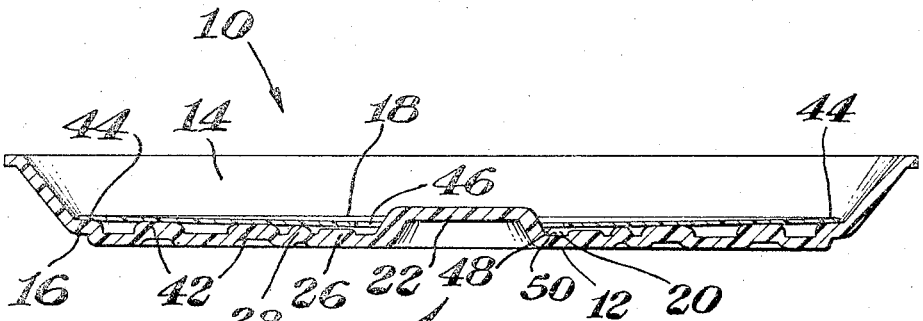

T 860,020

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1009

695,195
RESERVOIR TRAY
Robert F. Anderson, Midland, Mich.
(3613 13th St., Menominee, Mich. 49858)
Filed Jan. 2, 1968. Published Mar. 25, 1969
Class 229—2.5
1 Sheet Drawing. 16 Pages Specification

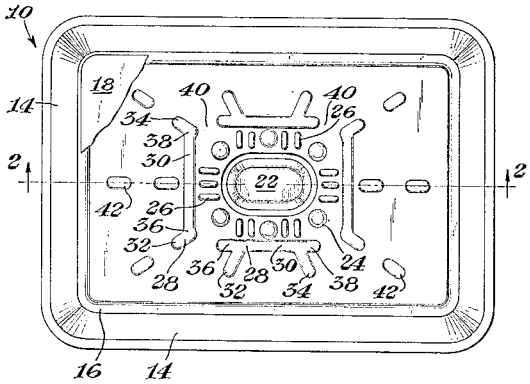

The present invention pertains to a double bottom tray including a reservoir located between the two walls of the double bottom. The reservoir is constructed so as to collect and trap juices naturally exuding from products like fish, meats, and poultry by utilizing the principles of capillary attraction and fluid surface tension. Additionally, a gravity drainage system is taught as an improved means for directing the juices to points of entry into the reservoir. Yet further beneficial aspects of the invention include baffles located within the reservoir to direct and control the movement of captured juices as, for example, when the tray is tipped or jarred, and a strategic partitioning of portions of the reservoir into capillary tube-like areas for increasing the reservoir fluid retention characteristics.

T860,020

SN - 695195

March 25, 1969 R. F. ANDERSON DEF. PUB.

RESERVOIR TRAY

Filed Jan. 2, 1968

INVENTOR.
Robert F. Anderson

BY
Burke M. Halbrook

ATTORNEY